US008780065B2

(12) United States Patent
Ribeiro et al.

(10) Patent No.: US 8,780,065 B2
(45) Date of Patent: Jul. 15, 2014

(54) INTERFACE AND SYNCHRONIZATION METHOD BETWEEN TOUCH CONTROLLER AND DISPLAY DRIVER FOR OPERATION WITH TOUCH INTEGRATED DISPLAYS

(71) Applicants: Milton Ribeiro, Los Altos, CA (US); Bart DeCanne, Sunnyvale, CA (US); Jan-Willem Van de Waerdt, San Jose, CA (US)

(72) Inventors: Milton Ribeiro, Los Altos, CA (US); Bart DeCanne, Sunnyvale, CA (US); Jan-Willem Van de Waerdt, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/678,146

(22) Filed: Nov. 15, 2012

(65) Prior Publication Data

US 2014/0022185 A1 Jan. 23, 2014

Related U.S. Application Data

(60) Provisional application No. 61/673,680, filed on Jul. 19, 2012.

(51) Int. Cl.
*G06F 3/041* (2006.01)
(52) U.S. Cl.
USPC ......................................................... 345/173
(58) Field of Classification Search
None
See application file for complete search history.

(56) References Cited

U.S. PATENT DOCUMENTS

| 5,634,080 | A | 5/1997 | Kikinis et al. | |
|---|---|---|---|---|
| 7,324,114 | B2 | 1/2008 | Mutanen et al. | |
| 2004/0222987 | A1* | 11/2004 | Chang et al. | 345/419 |
| 2009/0278984 | A1* | 11/2009 | Suzuki et al. | 348/554 |
| 2010/0042874 | A1 | 2/2010 | Lee | |
| 2010/0073323 | A1* | 3/2010 | Geaghan | 345/174 |
| 2010/0110040 | A1* | 5/2010 | Kim et al. | 345/174 |
| 2010/0182278 | A1* | 7/2010 | Li et al. | 345/174 |
| 2010/0194695 | A1* | 8/2010 | Hotelling et al. | 345/173 |
| 2010/0241957 | A1 | 9/2010 | Kim et al. | |
| 2011/0063229 | A1* | 3/2011 | Krah et al. | 345/173 |
| 2011/0157068 | A1 | 6/2011 | Parker et al. | |
| 2012/0013564 | A1* | 1/2012 | Westhues et al. | 345/174 |
| 2012/0069059 | A1* | 3/2012 | Lee | 345/690 |
| 2012/0242597 | A1* | 9/2012 | Hwang et al. | 345/173 |

OTHER PUBLICATIONS

International Search Report for International Application No. PCT/US13/20027 dated Mar. 8, 2013; 2 pages.
Written Opinion of the International Searching Authority for International Application No. PCT/US13/20027 dated Mar. 8, 2013; 7 pages.

* cited by examiner

*Primary Examiner* — William Boddie
*Assistant Examiner* — Carolyn R Edwards

(57) ABSTRACT

Apparatuses and methods of synchronizing a display driver integrated circuit (DDI) and a touch screen controller (TSC) integrated circuit that are coupled to a display integrated touch panel, such as an in-cell panel, and allowing multi-phase transmit (TX) scanning of the in-cell touch panel. One apparatus includes a DDI configured to receive signals on a video interface from a host processor over a video interface and to drive electrodes of a touch panel. The DDI is configured to receive control signals from a TSC over a control interface to drive different transmit (TX) phase sequences of a TX signal in different sensing interval on the electrodes of the touch panel.

20 Claims, 7 Drawing Sheets

INTERFACE AND SYNCHRONIZATION METHOD BETWEEN TOUCH CONTROLLER AND DISPLAY DRIVER FOR OPERATION WITH TOUCH INTEGRATED DISPLAYS

RELATED APPLICATIONS

This application also claims the benefit of U.S. Provisional Application No. 61/673,680, filed Jul. 19, 2012, the entire contents of which are incorporated by reference herein.

TECHNICAL FIELD

The present disclosure relates generally to capacitance-sensing systems, and more particularly to touch controllers and display drivers for operation with displays with integrated touch layers, for instance in-cell panels.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes and the conductive object is detected. The capacitance changes of the capacitive touch sense elements can be measured by an electrical circuit. The electrical circuit converts the measured capacitances of the capacitive sense elements into digital values.

There are two typical types of capacitance: 1) mutual capacitance where the capacitance-sensing circuit has access to both electrodes of the capacitor; 2) self-capacitance where the capacitance-sensing circuit has only access to one electrode of the capacitor where the second electrode is tied to a DC voltage level. A touch panel has a distributed load of capacitance of both types (1) and (2) and Cypress' touch solutions sense both capacitances either uniquely or in hybrid form with their various sense modes.

An in-cell liquid crystal display (LCD) panel is a LCD panel that also includes the touchscreen functionality by positioning at least one of the touch layers (typically the transmit (TX) layer) under the color filter glass. Furthermore typically the TX layer is shared with the common electrode (VCOM reference layer) of the display. A touch screen controller (TSC) may be a capacitive touch screen controller that is used to measure the capacitance on an array of electrodes, such as an array including multiple transmit (TX) electrodes and multiple receive (RX) electrodes. A display driver integrated circuit (DDI) is typically the integrated circuit (IC) positioned on the substrate glass of the LCD which drives the timing and video signals to the LCD. While the above description is for in-cell LCD, similar stackups exist for other display types, such as active-matrix organic light-emitting diode (AMOLED).

In-cell panels typically use shared layers between touch and display functions to minimize the module thickness and cost. In practice, LCD vendors are implementing LCD VCOM and Touch TX on the same layer. This may have two repercussions. 1) Since VCOM is only driven during the active video part, the consequence is that the capacitance touch scanning can only occur during quiet video times, i.e. video blanking times. Therefore, a timing synchronization is needed between a TSC integrated circuit and a DDI. 2) The DDI now needs to drive not only the VCOM signal, but also the TX signal. Therefore, the TSC needs to inform the DDI of a TX pattern sequence for the TX signal to send out on the layer.

BRIEF DESCRIPTION OF THE DRAWINGS

The present invention is illustrated by way of example, and not of limitation, in the figures of the accompanying drawings.

DETAILED DESCRIPTION

Figure 1:
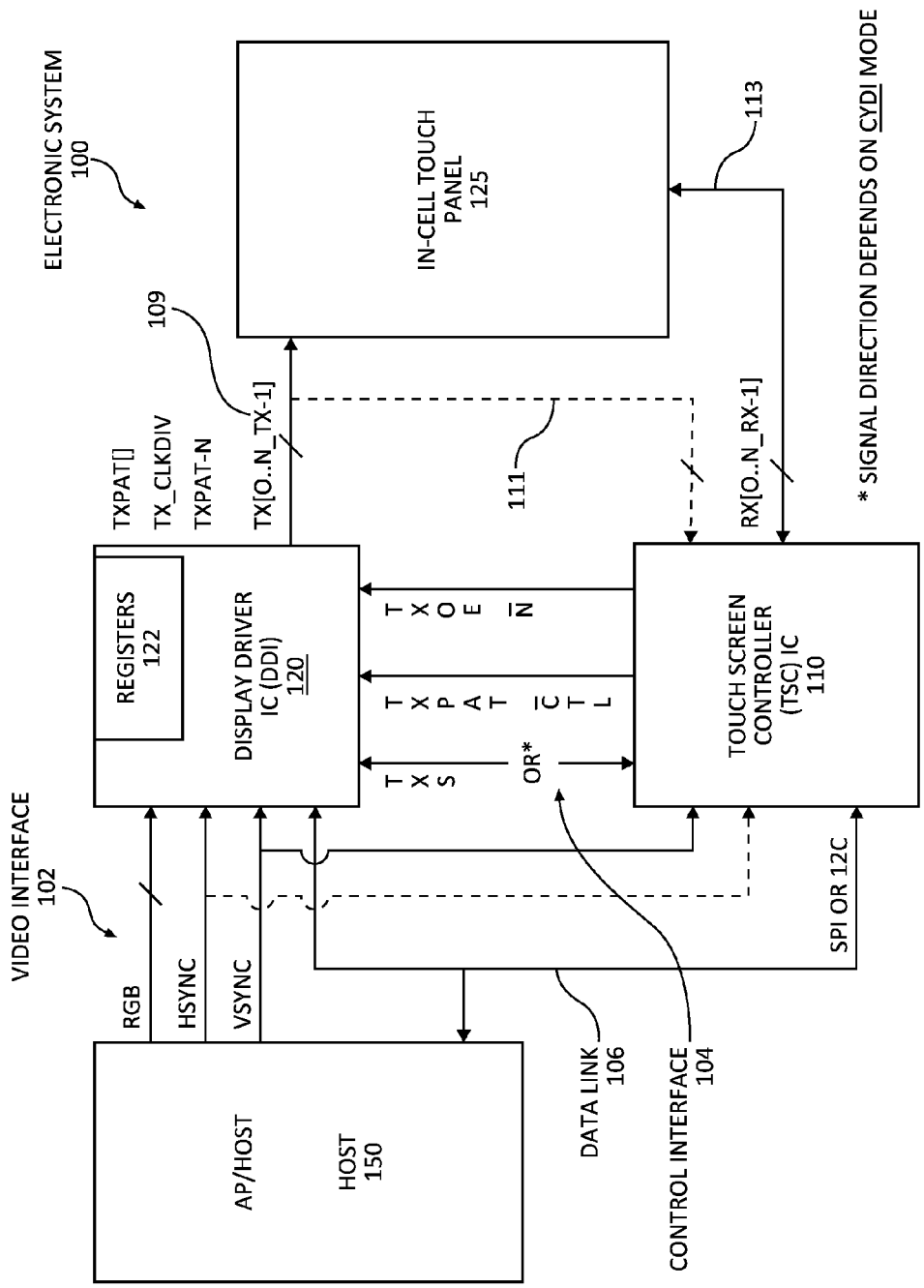
FIG. 1 is a block diagram illustrating one embodiment of an electronic system having an in-cell touch panel, a display driver integrated circuit (DDI) and a touch screen controller (TSC) for a legacy video interface.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

An In-cell touch panel may be an LCD panel that includes the touchscreen functionality by utilizing at least positioning one of the touch layers, typically the TX layer, under the color filter glass. Furthermore, typically the TX layer is shared with the VCOM reference layer of the display. As described above, in-cell touch panels typically use shared layers between a touch and display function to minimize the module thickness and cost, such as by implementing LCD VCOM and Touch TX on the same layer. Thus, a timing synchronization is needed between the TSC and the DDI to synchronize the touch controller scan windows to the display driver operation. The current solutions, however, only allow the TSC to send a signal pattern that excites one TX electrode at a time (referred to herein as single-phase scanning or single-phase mode). This may preclude the use of various features available when using multi-line or multi-phase TX scanning (also referred to herein as multi-phase mode). The embodiments described herein allow the use of multi-phase TX scanning to improve signal to noise ratio (SNR), as well as provide different sensing modes, such as water detection scanning, proximity sensing or the like. Although the embodiments described herein are directed to in-cell touch panels, the embodiments may also be used in other technologies, such as displays with integrated touch layers, on-cell displays or the like as would be appreciated by one of ordinary skill in the art.

In addition, some sensing modes use the TX electrodes as inputs to the TSC. Current in-cell touch panels permit TX output from the DDI and do not connect the TX electrode lines to the TSC. The embodiments described herein provide TX electrodes that can be used as outputs, as well as inputs to the TSC. To allow use of some sensing modes that improve performance for stylus, glove and proximity, the embodiments can be configured to not only route the TX signals to the TSC, but also be able to control the TX output to be switched off from the DDI when the TX electrodes are used as inputs into the TSC.

Furthermore, to allow flexible timing synchronization between DDI and TSC, embodiments of the proposed interface can be used to synchronize TX pattern playout to the display clock, and synchronize the RX sensing window to this same display clock. Also, the embodiments may flexibly control the scan timing with respect to display timing signals that are either available as discrete signals (horizontal synchronization signal (Hsync), vertical synchronization signal (Vsync)), described with respect to FIG. 1 below, or embedded signals in a high-speed video link, such as the tearing effect (TE) signal from the DDI, described below with respect to FIG. 2. HSync and VSync are the horizontal and vertical synchronization signals between the host (application processor) and DDI ICs in case of a legacy digital video interface, as illustrated and described with respect to FIG. 1. For modern serialized interfaces, for example, MIPI interfaces, these signals are not available as discrete signals. In these serialized interfaces, the TE signal from the DDI may be used to synchronize the TSC to the display. The TE signal is a timing signal from the DDI that identifies either only Vblank or both Vblank and Hblank timings. The TE signal is an input to the host (application processor) so that video data writes to the DDI are done so that write and read data pointers of the video frame memory in the DDI do not overlap. In the case of an in-cell touch LCD with MIPI interface, this signal then also needs to be routed to the TSC to synchronize its scan timing.

FIG. 1 is a block diagram illustrating one embodiment of an electronic system 100 having an in-cell touch panel 125, a DDI 120 and a TSC 110 for a legacy video interface 102. The electronic system 100 also includes a host processor 150 (also referred to as an application processor). The host processor 150 may be a microprocessor, a central processing unit (CPU), a controller, special-purpose processor, digital signal processor ("DSP"), an application specific integrated circuit ("ASIC"), a field programmable gate array ("FPGA"), or the like. The electronic system 100 has a video interface 102 between the host processor 150 and the DDI 120. The video interface 102 includes video signal, typically RGB, from the host processor 150, Hsync signals and Vsync signals. Alternatively, the video signals may be other color space than RGB. The Hsync and Vsync signals can also be input into the TSC 110. The electronic system 100 also includes a control interface 104 and data link 106 between the TSC 110, DDI 120 and the host processor 150. The control interface 104 includes TXS signal, TXPAT_CTL signal and TXOE_N signal, as described in more detail below. The control interface 104 may also include other signals, such as TXPAT_INC, TXPAT_RST, such as described herein. The data link 106 may be a serial peripheral interface bus, which is a synchronous serial data link that can operate in full duplex mode. Alternatively, the data link 106 may be an Inter-Integrated Circuit (I²C) interface, which is a multi-master serial single-ended computer bus. The in-cell touch panel 125 includes multiple electrodes (also referred to as sense elements or sensor elements). The multiple electrodes can be disposed as multiple TX electrodes (e.g., TX[0 . . . N_TX−1]) and multiple RX electrodes (e.g., RX[0 . . . N_RX−1]). The DDI 120 is coupled to the TX electrodes of the in-cell touch panel 125 and the TSC 110 is coupled to the RX electrodes of the in-cell touch panel 125. Also, as described herein, the TX electrodes of the in-cell touch panel 125 can be coupled as inputs to the TSC 110.

The DDI 120 includes the control interface 104 and register 122 to implement a display interface (referred to as CyDI) to the in-cell touch panel 125. The display interface includes the interface signals (TXS, TXPAT_CTL, TXOE_N) of control interface 104 between DDI 120 and TSC 110, and registers 122, which are to be included by the vendor of the DDI 120 to make them compatible with the TSC 110. The interface signals may be input/output (I/O) signals. The register 122 interface is implemented on the DDI 120 and it is assumed that the host processor programs both DDI 120 and TSC 110 register maps via existing control interface(s). In this embodiment, there is no direct programming of DDI registers by TSC 110, and thus no master I²C interface is needed between the TSC 110 and DDI 120. It should be noted that, in some cases, the control interface from the host can be different between DDI and TSC. For example, the host to TSC may be SPI or I²C interface and the host to DDI can be SPI, I²C or MIPI control bus, where the MIPI can carry both video and control data, such as described in FIG. 2.

In one embodiment, a device driver, running on the host processor 150 provides programming for both TSC and DDI registers that are specified below as part of this display interface definition, using the existing control interface to each part. The display interface definition allows for TX patterns that can produce either 0-degree phase-shifted ("+"), 180-degree phase shifted ("−"), ground potential ("0") outputs or Hi-Z output on each of the individual TX lines 109 (coupled to the TX electrodes of the in-cell touch panel 125). The TSC 110 measures RX signals on the RX lines 113 (coupled to the RX electrodes of the in-cell touch panel 125). In a further embodiment, there is provision to impose Hi-Z output on all TX signals from the DDI 120 to allow the TX lines 109 to be driven by the touch screen controller 110 on lines 111. It should be noted that a maximum allowable duration of Hi-Z output on VCOM may be specified to prevent LCD image degradation.

Figure 2:
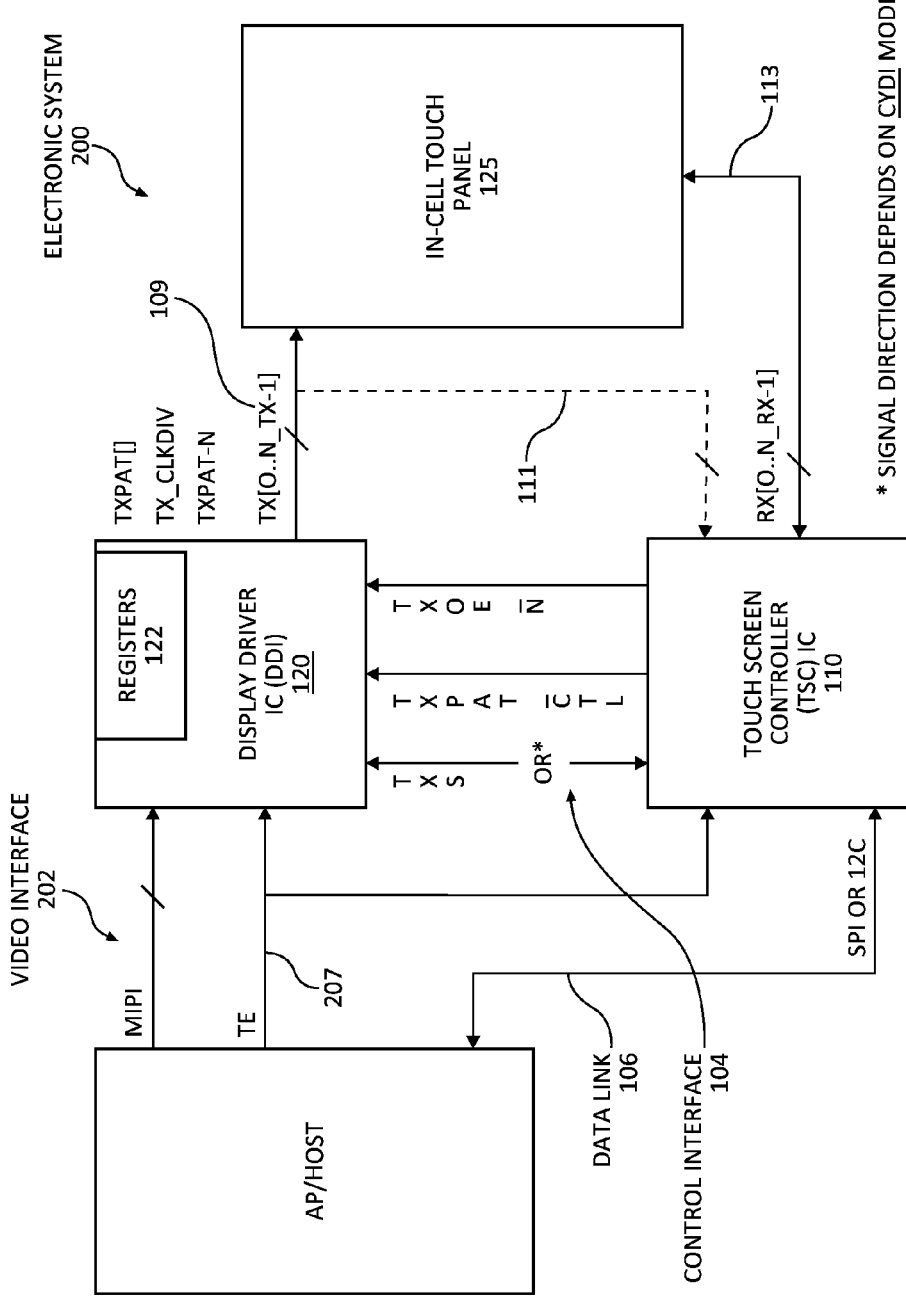
FIG. 2 is a block diagram illustrating another embodiment of an electronic system having an in-cell touch panel, a DDI and a TSC for a video interface.

FIG. 2 is a block diagram illustrating another embodiment of an electronic system 200 having an in-cell touch panel 125, a DDI 120 and a TSC for a video interface 202. The electronic system 200 is similar to the electronic system 100 as denoted by similar reference numbers, except for the video interfaces. The interface 202 may be a high-speed packetized video link, such as the MIPI® video link developed by under the Mobile Industry Processor Interface (MIPI®) Alliance specifications. Alternatively, the interface 202 may be other video interfaces as would be appreciated by one of ordinary skill in the art. The interface 202 may carry command data and can be used to replace a separate command SPI/I2C interface between the host processor 150 and the DDI 120, as shown as data link 106 of FIG. 1. A data link 206 may be between the host processor 150 and the TSC 110 as depicted in FIG. 2. In the depicted embodiment, the H & V video synchronization signals are embedded (no discrete HSync, VSync signals exist) in the MIPI video link. The DDI 120 then generates an output TE signal 207 that identifies blanking times, so the host processor 150 can synchronize its writes to the DDI frame buffer. This same output TE signal 207 is then also used by the TSC 110 to synchronize timing of its scan. The operation of the display interfaces depicted in FIGS. 1 and 2 are described in more detail below after an explanation of single phase scanning with respect to FIG. 3 and multi-phase scanning with respect to FIG. 4.

Figure 3:
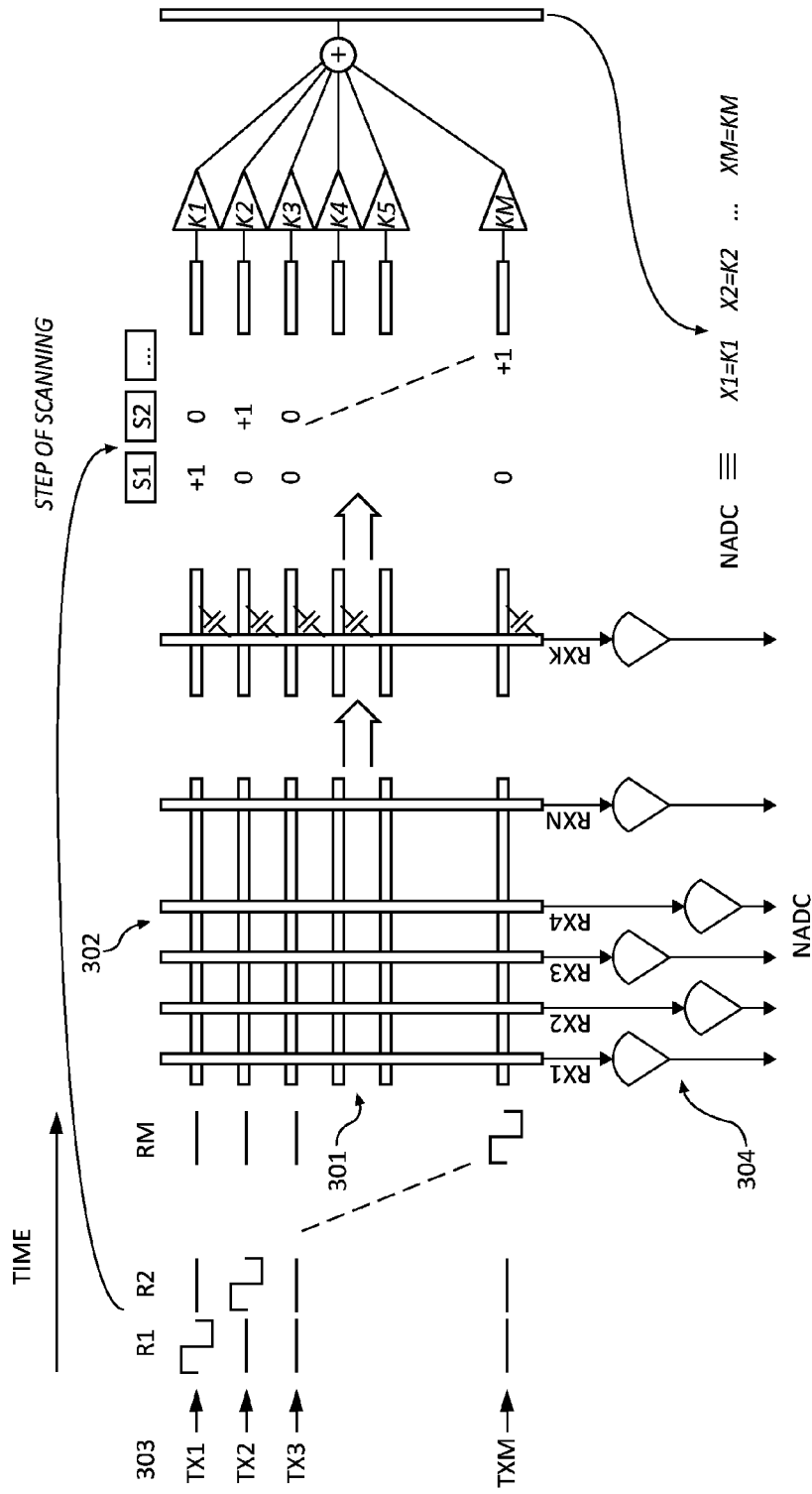
FIG. 3 is a schematic flow chart illustrating a traditional scanning technique according to one embodiment.
Figure 4:
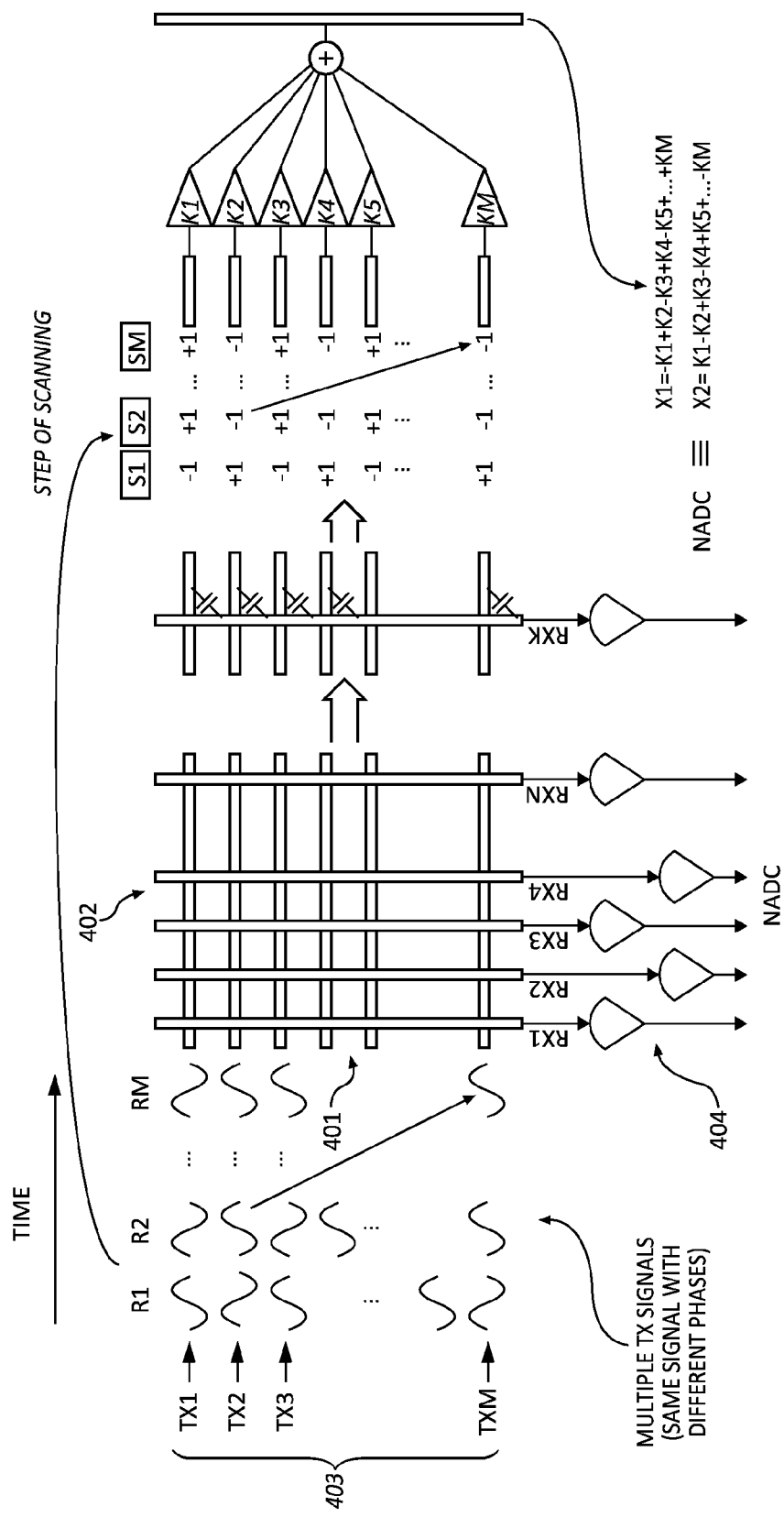
FIG. 4 is a schematic flow chart illustrating a multi-phase scanning technique according to one embodiment.

FIG. 3 is a schematic flow chart illustrating a traditional scanning technique according to one embodiment. In a capacitive sensor array with M rows and N columns, the traditional method of sensor matrix scanning includes applying a transmit (TX) signal 303 to one row (e.g., from the DDI 120 on TX lines 109) and detecting the response from the RX columns (e.g., by the TSC 110 on the RX lines 113). Therefore, the TX signal 303 is applied to the TX electrodes 301 in series between different panel scanning intervals (also referred to herein as stages), as depicted in FIG. 3. The non-energized TX electrodes 301 are grounded. In FIG. 3, when the TX signal is applied to a TX row, the row is indicated with +1. When the TX electrodes 301 are grounded, they are indicated with 0. Thus, full panel scanning sequence corresponds to the moving "+1" between different TX electrodes during different scanning intervals. In FIG. 3, the TX signals 303 are square waveforms. Alternatively, the TX signals 303 may have other waveforms, such as sinusoidal waveforms, as illustrated in FIG. 4.

The one receiver column may be represented as a capacitive adder for TX excitation signals, passed via panel. As the conventional sequential scanning scheme applies only one TX signal 303 to the one row electrode 301 at same time, the receiver signal is proportional to the mutual capacitance between the excited row 301 and receiver column 303 only. This signal after rectification and analog-to-digital converter (ADC) 304 conversion (in the TSC 110) may be represented as some $N_{ADC}$ value.

The gain factor between j-row and i-column may be represented as kji, where k is proportional to the mutual capacitance between row and column.

$$K = \begin{bmatrix} k_{11} & k_{12} & \dots & k_{1N} \\ k_{21} & k_{22} & \dots & k_{2N} \\ \dots & \dots & \dots & \dots \\ k_{M1} & k_{M2} & \dots & k_{MN} \end{bmatrix} \quad (1)$$

As the TX signal is applied in series to the all panel rows, the elements of this matrix are obtained on a row-by-row basis, synchronously with applying TX signal to the corresponding row. This may be explained in the following equations:

$$V_{k,j} = \delta_{kj}, \quad (2)$$
$$\forall k \in \overline{1,M}$$
$$\delta_{kj} = \begin{cases} 1 & k = j \\ 0 & k \neq j \end{cases}$$

where $V_{kj}$ is the TX signal for j row for the k scanning stage. For the entire panel scanning procedure, the TX signals may be represented by the following diagonal matrix with M*M dimensions:

$$S = \begin{bmatrix} 1 & 0 & \dots & 0 \\ 0 & 1 & \dots & 0 \\ \dots & \dots & \dots & \dots \\ 0 & 0 & \dots & 1 \end{bmatrix} \quad (3)$$

Each receiver represents signals, coming from multiple TX electrodes, it can be written in the following form for the i-column receiver output signal and j-scanning stage:

$$N_{ADC\,ij} = \sum_{k=1}^{M} k_{ik} S_{kj} \quad (4)$$

As a matrix, it may be expressed as $$N_{ADC} = K \cdot S \quad (5)$$

Taking into account the S is diagonal matrix, the linear equations set (5) may be simplified to the following $$k_{ij} = N_{ADC\,ij}, \forall i \in \overline{1,N}, \forall j \in \overline{1,M} \quad (6)$$

Thus, calculating gain is directly proportional to the ADC readings and do not require any additional computations. If there are N receivers, all columns are sensed at same time. If one row scanning time is τ, the total panel scanning time $T_P$ is:

$$T_P = \tau M \quad (7)$$

For the panels with a large number of TX electrodes, single row scanning time is a small fraction the total panel scanning time. Thus, the row capacitances are measured during very short time interval, resulting in SNR degradation due to the limited number of TX cycle processing for the one row scanning. Another disadvantage of using the short conversion time is receiver bandwidth increasing, causing the external noise immunity degradation.

Details of an embodiment for a TX multiphase scanning method will now be described. It is desirable to receive row signals during whole panel scanning time $T_P$. This may be achieved by applying TX signals (e.g., TX signals 403 of FIG. 4) to more than one row at the same time. If the same TX signals are applied to all TX electrodes, touch detection only in one coordinate may be implemented. In order to recover each row-column intersection mutual capacitance value (or full matrix K), properties of the individual TX signal may be changed at the different scanning stages to distinguish signals at different scanning phases and to resolve multiple touches. The following TX signal properties may be changed: amplitude, phase and frequency.

A simple and easy way to implement this in the digital domain is binary phase modulation. In this case, each TX electrode may be driven either in-phase with the demodulation signal, or with the opposite phase as the demodulation signal.

In general, the method includes applying different TX phase sequences for different sensing intervals and collecting channel readings for each interval. In other embodiments, the method may include applying different TX signals, such as different frequencies of the TX signal, pseudo-random sequences, phase-shifted signals, orthogonal sequences or the like. FIG. 4 illustrates a scanning sequence according to one embodiment. If multiple TX signals 403 are driven simultaneously, the receiver signal is the algebraic sum of the signals received from the different TX electrodes 401.

If the i TX electrode phase for the j scanning stage is equal to $F_{ij}$, $F_{ij}$ may accept only two values: $F_{ij}=1$ for the in-phase excitation and $F_{ij}=-1$ for the opposite phase excitation signals, as all TX electrodes 401 are activated at same time. The F in the matrix form may be represented in the following way:

$$F = \begin{bmatrix} f_{11} & f_{12} & \dots & f_{1N} \\ f_{21} & f_{22} & \dots & f_{2N} \\ \dots & \dots & \dots & \dots \\ f_{M1} & f_{M2} & \dots & f_{MM} \end{bmatrix} \quad (8)$$

There is easy to find the gain matrix K for the scanning sequence of phase modulated TX signals. By substituting the F matrix to the Equation 5 instead matrix S, the following linear equations set is obtained:

$$N_{ADC} = K \cdot F \quad (9)$$

By resolving the equation set (8) for the gain matrix K:

$$K = N_{ADC} \cdot F^{-1} \quad (10)$$

where F−1 is the inverse matrix for matrix F, which may be determined by any known method at the device design time, as matrix coefficients are constants and do not change during system operation.

The computational requirements for Equation 10 may easily be estimated: the NADC is N*M matrix and F−1 is M*M matrix. Thus, matrix multiplication requires $N \cdot M^2$ MAC operations. For a panel with M=16 and N=11, 2816 MAC operations are required for each scanning cycle. It should be noted that the details of phase modulation function selection have not been included herein to not obscure the description of the proposed embodiments.

The description above introduces the concept of single phase scanning and multi-phase scanning. As described above, the embodiments of the display interface, such as those described with respect to FIGS. 1 and 2 can provide synchronization between the DDI 120 and TSC 110, as well as provide the ability to perform both single phase scanning and multi-phase scanning. Furthermore, the display interface allows the TX electrodes of the in-cell touch panel 125 to be configured as inputs to the TSC 110. The operation of the display interfaces depicted in FIGS. 1 and 2 are described in more detail below.

The display interfaces depicted in FIGS. 1 and 2 may provide a number of simultaneous TX outputs and a number of patterns (such as those of an excitation matrix) that are equal. This may be a typical case for patterns that include only 0 and 180 degree phase shifted square wave signals (traditional case: square matrix with only +,− patterns and characterized by cyclically shifted patterns). The display interface may also provide a number of patterns that is higher than the number of TX outputs. This may be used when patterns can additionally have zero outputs. For example, symbolically the pattern sequence of the TX signals on the TX lines 109 can be defined as an excitation matrix. The following table is the DDI register format for a TX excitation pattern matrix.

$$TXPAT[i][j], \quad (11)$$

where:

i=0 . . . (MP_TOTAL−1) with MP_TOTAL=total number of electrodes (X+Y) outputs that can be simultaneously activated since the reversible patterns for some TX patterns may be driven by TSC; and j=0 . . . (MP_PAT−1) with MP_PAT=number of patterns in the pattern sequence. The following table, Table 3, provides a set of registers and bit field definitions that can be used for the DDI 120. In this example, the dimensions of the TX pattern matrix in the DDI are 64×64 symbols with 2-bit wide symbols, and the dimensions in bits are 128×64. The total number of bits equals 8192 or 1024 bytes.

TABLE 3

| Address | Bytes | Name | Description |
|---|---|---|---|
| | | DDI Register Definition | |
| 0X0000 | 1024 | TXPAT | TX pattern matrix. There are four types of symbols that can be stored in the pattern matrix. Each symbol is 2-bits wide: "00": GND "01": + (i.e., non-inverted with respect to TX signal) "10": − (i.e., inverted with respect to TX signal) "11": Hi-Z output |
| 0X0400 | 1 | TXPAT_N | Max number of patterns. If the index counter is greater than or equal to this value, the DDI stops the TX output patterns and drives them to GND during the blanking period |

Table 4 provides the format of the bit fields and patterns within the 1024 byte array.

TABLE 4

DDI Register Format for TX Pattern Matrix

| TX PATTERN | ADDRESS | TX OUTPUTS BIT FIELD FORMAT |
|---|---|---|
| TX PATTERN 0 | 0x0000 | [7:6] TX3, [5:4] TX2, [3:2] TX1, [1:0] TX0 |
| . . . | . . . | . . . |
| | 0x001F | [7:6] TX63, [5:4] TX62, [3:2] TX61, [1:0] TX60 |
| TX PATTERN 1 | 0x0020 | [7:6] TX3, [5:4] TX2, [3:2] TX1, [1:0] TX0 |
| . . . | . . . | . . . |
| | 0x003F | [7:6] TX63, [5:4] TX62, [3:2] TX61, [1:0] TX60 |
| . . . | . . . | . . . |
| TX PATTERN 63 | 0x01E0 | [7:6] TX3, [5:4] TX2, [3:2] TX1, [1:0] TX0 |
| . . . | . . . | . . . |
| . . . | 0x01FF | [7:6] TX63, [5:4] TX62, [3:2] TX61, [1:0] TX60 |

The TX excitation pattern refers to the phase relationship between driven TX electrodes. For example, electrodes Y[0] and Y[1] can be in the following pattern: Y[0]=+, and Y[1]=−. In this example, Y[0] is 180° phase with respect to Y[1]. There are multiple TX patterns sequenced in a TX scan. The TX pattern matrix may be programmable memory in the DDI chip that controls the phase of TX waveforms for each TX output.

The TX excitation pattern can be stored in memory of the DDI 120. Allowing for MP_PAT=1.5×MP_TOTAL, there can be 50% more patterns defined than the number of X+Y electrodes. Also, since each matrix location has to identify one of 4 possibilities (+, −, 0, Hi-Z), each matrix location uses two bits; thus, the TXPAT memory size is (MP_TOTAL*2)* (1.5*MP_TOTAL) bits.

The DDI playout on each TX line 109 is uniquely defined at any one time by one column of the TXPAT matrix. DDI playout is the excitation of the TX lines 109 according to the excitation pattern (e.g., TXPAT matrix). The DDI 120 further needs to know when to advance to the next column (upon TXPAT_INC signal from TSC 110, rising edge triggered) and when to reset the column pointer to playout of the first pattern (TXPAT_RST signal from TSC 110, rising edge triggered), for instance at the start of a new video frame (though also elsewhere if we are to generate a higher touch report rate than the display rate).

The above display interface definition allows flexibility to either generate a pattern sequence including a number of patterns equal to the number of simultaneous TX outputs (MP_PAT=N_TX) or higher than the number of simultaneous TX outputs (MP_PAT>N_TX). Also, the display interface definition can allow for the case that the length of the pattern sequence is less than the number of simultaneous outputs (e.g., to reduce the order of de-convolution). For example, this case can be accommodated by the TSC 110 asserting the TX_PAT_RST signal after M patterns with M=N_TX/k, k integer, so that the pattern sequence is repeated k times for a single MPTX scan sequence.

Furthermore, it is possible, by the programming of TXPAT into DDI memory, to accommodate for some TX outputs that are kept at GND potential during one, some or all patterns, simply by programming "0" for those outputs into the matrix. Thus the case of "1-TX" output is a special case when TXPAT only has non-zero elements on the matrix diagonal. The panel short side (X electrodes) may be Hi-Z outputs in this scenario.

In one embodiment, the DDI 120 stores TXPAT in volatile memory. Therefore, the TXPAT can be programmed into DDI memory at each power-up by the device driver running on the host processor 150.

Video Frame Synchronization

For the TSC 110 to generate signals that are synchronized to the video frame (TXPAT_INC, TXPAT_RST, and TX_OE_N) it has to know H and V display timing references. Depending on the case, either HSync, VSync signals of video interface 102 of FIG. 1 can be directly available from the host processor 150, or a composite sync signal (CSync) is available in the form of a TE (tearing effect) signal generated by the DDI 120 (not illustrated in FIG. 1 and illustrated as TE 207 in FIG. 2).

The TSC 110 needs to synchronize its scanning to the blanking times of the DDI output. This can be done by appropriately programming the start and end of scan times on the TSC 110 with respect to incoming V, and possibly also H, timing references. At a minimum, a V reference needs to be available (from a VSync, or alternatively a TE signal carrying VSync) since the TXPAT_RST signal is typically issued at least once per video frame to keep DDI 120 and TSC 110 in sync. When only a V reference is available, the DDI 120 and TSC 110 can be synchronized during VBlank. If additionally an H timing reference is available (from HSync, or TE signal carrying CSync), then the TSC 110 can be programmed to scan either during HBlank or VBlank.

TX Playout Synchronization

Two modes may exist as part of this interface to synchronize the TX playout frequency between DDI 120 and TSC 110, depending on which device provides the master clock.

1) Mode "TxMode_TSC": TSC 110 is master for TX output. In this case, the TSC 110 provides a 0-degree square wave output signal, TX Source (TXS), to DDI 120. The DDI 120 will either: a) output this signal onto the designated output for those TX outputs defined as "+" in the TXPAT matrix, b) output this signal after passing through an internal inverter for those TX outputs defined as "−" in TXPAT matrix), c) output GND onto those TX outputs defined as "0" in TXPAT matrix, or d) Hi-Z (high impedance) output on the TX outputs define as "z".

The interface of this signal through the DDI 120 is assumed to be combinatorial (no re-clocking to DDI clock) so that clock synchronization of TX outputs to TSC 110 is maintained. Since the clock source comes from the TSC 110, no further clock synchronization would be needed.

2) Mode "TxMode_DDI": DDI 120 is master for TX output. In this case, the DDI 120 generates the TX output frequency as a sub-multiple of its own clock frequency. This mode may have the advantage that the TX output is synchronous to the display clock, and thus can make display noise events synchronous on every scan. A host programmable register (e.g., TX_CLKDIV) in DDI memory can be used to divide the DDI clock to reach the desired TX frequency. The 0-degree phase shifted clock is output from DDI 120 to TSC 110 (signal TXS), so that TSC 110 can synchronize its RX scan to this during the programmed scan window.

As such, in either mode, there is 1 signal, TXS, either TSC 110→DDI 120 or DDI 120→TSC 110 depending on which IC provides the master clock, and this signal is used for synchronization between both. The signal direction of TXS depends on the mode.

The following describes examples of the register map and the I/O signals of the control interface 104.

Register Map

Convention: ARR[0..m−1](n−1:0)→m element array with each element of n bits. MAT[0..m−1][0..n−1](p−1..0)→2D matrix of m rows×n columns, with each matrix element of p bits.

| Name | Notes |
|---|---|
| TXPAT [0 ... MP_TOTAL−1] [0 ... MP_PAT−1] (1:0) | TX pattern matrix. Each location is a 2-bit value with the following syntax: "00": GND "01": + "10": − "11": Hi-Z It is expected either 1KB or 2KB of DDI memory is allocated (see calculations herein). |

| Name | Notes |
|---|---|
| TX_CLKDIV (used in TxMode_DDI only) | Sets playout frequency of the TXPAT pattern output as a divider of the DDI clock. DDI plays out a square wave signal with L->H and H->L transitions, as determined by the DDI clock divided by TX_CLKDIV, during blanking time as long as TX_OE is asserted (low).<br>The pattern that is played out by the DDI changes upon receiving an active edge on TXPAT_INC.<br>The bit-width and semantics of this register may depend on the DDI clock frequency and are such that a playout square wave frequency in the range of 10-700 kHz, for example, can be generated. |
| TXPAT_N | Number of patterns actually used in matrix TXPAT, i.e. only columns 0 . . . (TXPAT_N − 1) are effectively used. In normal use, the column pointer should never exceed (TXPAT_N − 1) i.e. the TSC should ensure to assert TXPAT_RST to avoid this condition. However the DDI can have built-in logic to stop further pattern playout (i.e. all TX outputs will be held at GND during blanking time) if TXPAT_INC causes the TXPAT column pointer to be equal or higher than TXPAT_N. |

20

I/O Signals

| Name | # of pins | Direction | Notes |
|---|---|---|---|
| TX[0 . . . (N_TX−1)] | N_TX | DDI->Sensor & Sensor->TSC | TX outputs from DDI. N_TX is the maximum number of I/Os that can be configured as TX outputs and thus depends on the TSC part# the interface is to be used with.<br>Unused outputs can be driven to GND.<br>During active video:<br>TX[1] = TX[2]= . . . =TX[N_TX] = VCOM, as is the case for normal DDI operation with un-patterned VCOM.<br>During blanking, the active outputs playout a pattern as defined by TXPAT but only when TX_OE_N is asserted (low), otherwise the DDI is to provide Hi-Z outputs on all TX lines.<br>Optionally these TX lines can be connected to TSC as well as enable extra sensing modes. |
| RX [0 . . . (N_RX−1)] | N_RX | Sensor->TSC | Note: these signals are only going to TSC, not to DDI. |
| HSYNC/HBLANK and VSYNC/VBLANK or VSYNC/VBLANK or CSYNC/CBLANK | 2 1 1 | DDI->TSC | BLANK frames inactive period of video while SYNC signals may have front/backporch timings so they do not frame blank times but only provide timing reference. TSC scans based on programmable timing offset with respect to active edge of this signal. If HSYNC/HBLANK signal is available (since scanning is to occur during HBlank) then in addition a VSync/VBlank should be provided as well to have a video frame reference into the TSC. |
| TXS | 1 | TSC->DDI (TxMode_TSC) or DDI->TSC (TxMode_DDI) | Reference clock signal at the TX excitation frequency.<br>TxMode_TSC: TX source signal sent to DDI by TSC to output onto TX lines, either 0 or 180-degree phase shifted as defined in TXPAT for the current pattern being played out.<br>TxMode_DDI: TX source signal sent to TSC by DDI to synchronize receive scan window. In this case, excitation is generated by DDI and host needs to program register TXCLK_DIV on DDI to set its frequency. |
| TXPAT_INC | 1 | TSC->DDI | Rising active edge identifies when the DDI should switch to the next pattern in the pattern sequence as defined by a column in TXPAT matrix i.e. switch from TXPAT[i][j] to TXPAT[i][j + 1] on each of the i: 0 . . . (N_TX − 1) TX outputs.<br>The TSC should ensure to assert this signal outside the scanning window.<br>If the pattern is increased beyond the last valid pattern in the sequence, then there shall be no (i.e. GND potential) output on all TX outputs, see TXPAT_N register in DDI. |

-continued

| Name | # of pins | Direction | Notes |
|---|---|---|---|
| TXPAT_RST | 1 | TSC->DDI | Rising active edge identifies when the DDI should reset to playout of the first pattern in the TXPAT matrix, i.e. TXPAT[i][0] on all i: 0 ... (N_TX - 1) TX outputs. The TSC should ensure to assert this signal outside the scanning window. |
| TX_OE_N (optional) | 1 | TSC->DDI | Active low output enable for DDI: when low, DDI drives TX outputs during its blanking times. This allows flexibility for TSC to shut off TX outputs from DDI (to allow TX lines to become inputs to TSC), as well as for TSC to only activate TX outputs from the DDI during the times that it performs the scan (e.g. only during VBlank, not HBlank). TX_OE_N affects all TX outputs from DDI equally; it is not possible to only provide Hi-Z output on some outputs. TX_OE_N is optional. In case it is not implemented in the DDI/TSC interface, then the DDI drives the TX pattern as defined by TXPAT onto its TX outputs during blanking times (both HBlank and VBlank). |

Figure 5:
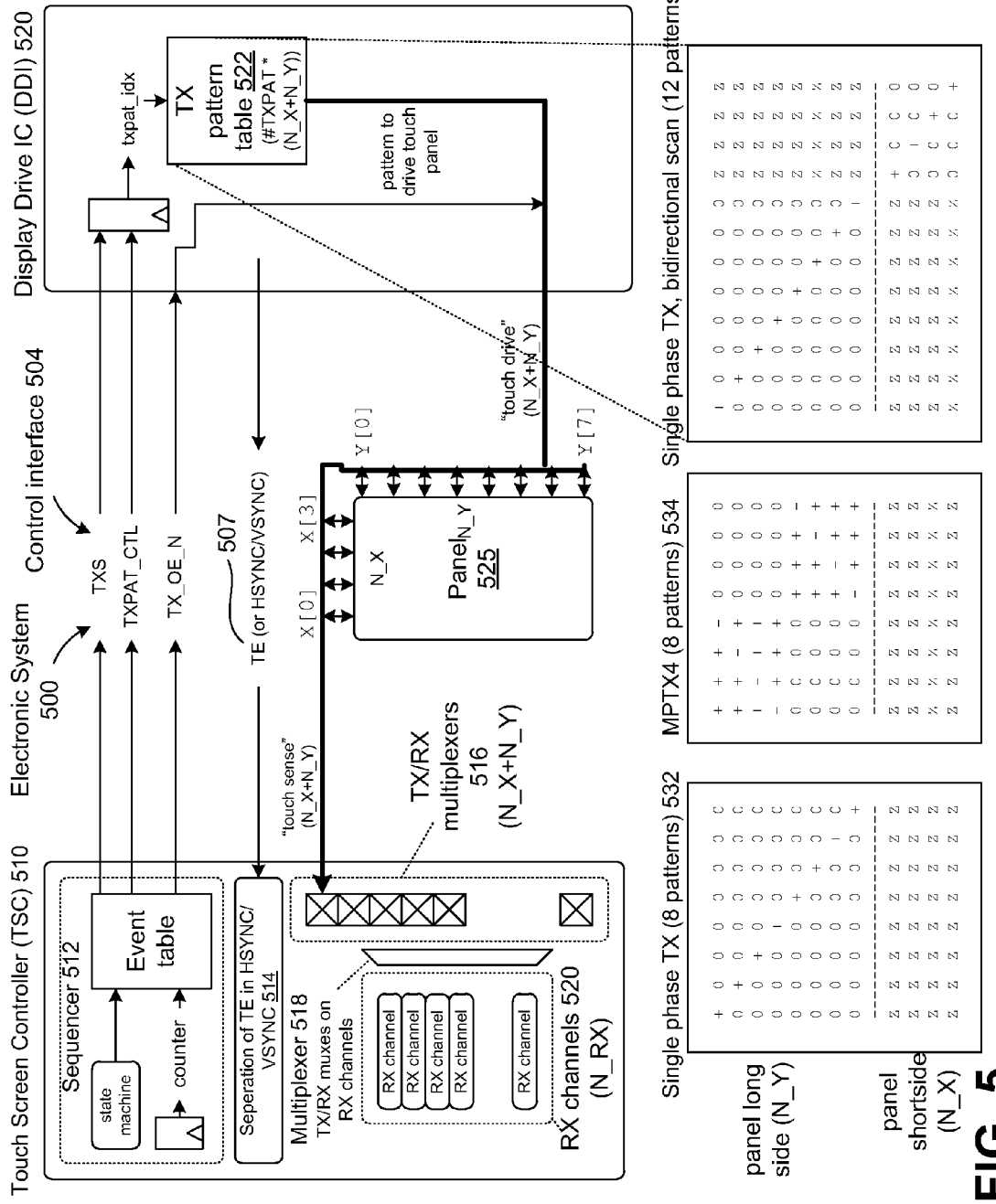
FIG. 5 is a block diagram illustrating one embodiment of an electronic system having an in-cell touch panel, a TSC, a DDI with a TX pattern table.

FIG. 5 is a block diagram illustrating one embodiment of an electronic system 500 having an in-cell touch panel 525, a TSC 510 and a DDI 520 with a TX pattern table 522. The touch panel 525 includes multiple electrodes 8×4, including Y[0]-Y[7] on the panel long side and X[0]-X[3]. The TSC 510 includes a sequencer 512 that generates and sends the interface signals (e.g., TXS, TXPAT_CTL, TX_OE_N) on a user interface 504. It should be noted that FIG. 5 illustrates three interface signals on the control interface 504. In another embodiment, a reset signal (TXPAT_RST) and an increment signal (TXPAT_INC) can be separate signals. In one embodiment, the sequencer 512 uses a state machine, a counter, and an event table to generate the corresponding interface signals. The DDI 520 receives the interface signals to control the TX pattern table 522. The DDI 520 also sends a TE signal 507 (or Hsync/Vsync) back to the TSC 510. The TSC 510 can include logic or other circuitry to separate the TE signal into Hsync/Vsync if needed. Referring back to DDI 520, the TX pattern table 522 may include various excitation signals, such as the three examples provided in FIG. 5. For example, the TX pattern table 522 may be a single-phase TX matrix (8 patterns) 532, a multi-phase TX matrix (8 patterns) 534 or a single-phase TX, bi-directional scan matrix (12 patterns) 536. The TX matrices make a distinction between GND output ("0"), Hi-Z (high-impedance or floating) output ("Z"), as well as an in-phase signal ("+") and an out-of-phase signal ("−1"). When TX lines are connected back to TSC 110, then in some sense modes the TSC 110 drives the TX lines, so the DDI 120 needs to have Hi-Z output when the TSC 110 drives the TX lines. This is shown by the Z symbol in FIG. 5. Alternatively, other matrices can be used as would be appreciated by one of ordinary skill in the art having the benefit of this disclosure. The excitation pattern of the TX pattern table 522 is configured to drive the touch panel 525. The TSC 510 also include TX/RX multiplexers 516 (N_X+N_Y), as well as multiplexer 518 of the TX/RX multiplexers on the RX channels 520. The TX/RX multiplexers 516 are configured to switch the electrodes between being RX electrodes or TX electrodes, and the multiplexer 518 is to switch the TX/RX multiplexers 516 and the multiple RX channels 520.

The following describes various alternative embodiments of different features of the display interfaces of FIGS. 1, 2 and 5.

Alternative definition of TX patterns
Instead of storing the TX patterns in DDI memory as a matrix, some other method may be used to define the patterns to the DDI 520. For example, by using multiple pattern definition signals between TSC 510 and DDI 520 that determine each, or groups of, simultaneous TX signal(s) played out from the DDI 520. This is a more straightforward implementation, but may be less scalable for larger screen sizes.

Register-Only Synchronization Between DDI and TSC
Rather than using physical signals, timing synchronization and TX pattern definitions could be exchanged directly between DDI 520 and TSC 510 using a control interface that reads/writes registers on both ICs Direct Communication Between DDI and TSC
In the display interface definition described above, the host/AP programs both DDI 520 and TSC 510. This avoids the need for a master-I2C interface on the TSC 510. Alternatively a master-I2C could be implemented on one of the parts to directly control the other device without host/AP intervention.

VCOM/TX Layer Driven by TSC Instead of DDI
The display interface definition described above has the DDI 520 output TX signals to the shared Vcom/TX layer. Alternatively the TSC 510 could output those signals. Possibly a time-multiplexing could be done with the TSC 510 driving TX during blanking, and DDI 520 driving VCOM levels during active video.

Host Driver to Communicate TX Patterns to Both the Touch Controller (TSC) and DDI
Instead of using a source signal from one of both parts (signal TXS in definition above) and then using a pattern matrix to define the playout on all TX outputs, the host driver could alternatively communicate the patterns used for playout to both ICs.

Host Driver Read the TX Patterns from the TSC and Send them to the DDI
Instead of using a source signal from one of both parts (signal TXS in definition above) and then using a pattern matrix to define the playout on all TX outputs, the host driver could alternatively communicate the patterns used for playout to the TSC and the TSC sends them to the DDI.

Dual-Function Pins that can Serve Either as TX/RX Sense Pins or Communication Pins to Talk to the DDI
The display interface definition above assumes dedicated pins for DDI 520 and TSC 510 interface. Potentially some pins already present on DDI 520 could be used to communicate with TSC 510.

TSC Serially Send the TX Patterns to the DDI, Using the Same Pins Used for Timing Control In the same spirit of sharing already existing pins, timing synchronization between DDI 520 and TSC 510 and TX patterns could be sent via shared pins.

DDI Control the TX Timing and Demodulation (TX Timing is an Output of the DDI)

This is described above as "TXMode_DDI".

TSC Control the TX Timing and Demodulation (TX Timing is an Input to the DDI)

This is described above as "TXMode_TSC".

Ability to Float the Embedded TX Electrodes to Allow Self-Cap Measurement, and Multiplexer to Allow TX Electrodes to be Selected and Routed to TSC 110 for Self-Cap Sensing This is accommodated in display interface definition via the TX_OE_N control signal; however alternative embodiments that arrive at the same result, such as register control instead of physical I/O, can be used as well. It should be noted that the Hi-Z addition in the pattern matrix may be another method to achieve this now on a pattern by pattern basis.

Ability to Selective (by Address) a Specific TX Pattern in the DDI 120 TX Pattern Buffer Instead of the matrix method, patterns could be user-programmed, or pre-defined, at certain memory location and could be selected by updating a memory pointer or writing a pattern ID.

Ability to Select (by Address) a Specific Starting TX Pattern in the DDI TX Pattern Buffer Instead of the matrix method, patterns could be user-programmed, or pre-defined, at certain memory locations and while the sequence of pattern playout is fixed, the starting pattern could be changed on each TX output such that cyclically shifted patterns are being played out on every TX output without having to store all patterns in memory.

Ability to Start Sensing Relative to a Time Reference Signal from the DDI 120 (V-Sync, H-Sync, or TE)

It should be noted that the embodiments described herein can be used to synchronize DDI and TSC based on the TE signal, rather than the legacy HSync, VSync.

Ability to Delay Start of Sensing Relative to Time Reference Signal from the DDI Ability to delay the start of scan user-programmable with respect to any of the timing signals listed above.

Ability to Encode States into the Control Signals

The proposed interface signals can probably be reduced if their semantics are made more complicated by e.g. encoding "states" into these signals.

Ability to Start/Reset the TX Pattern Sequence Once Per Frame (i.e., Scan at 60 Hz when Frame Rate is 60 Hz), More than Once Per Frame (e.g., Scan at 60, 120, 180 Hz), or an Asynchronous to the Frame Rate (e.g., Scan at 100 Hz when Frame Rate is 60 Hz)

The display interface definition described above may also use the TXPAT_RST and TXPAT_INC signals to control the frequency with which TX patterns change and also the frequency at which a pattern sequence is reset. This allows full flexibility to make the pattern sequence frequency identical to, a (sub-) multiple of, or asynchronous to, the display refresh rate. In other embodiments, the TX pattern can be started or rest more than one per frame. In other embodiments, the TX pattern can be asynchronous to the frame rate.

Ability to Phase Delay the Demodulator Relative to the Output TX Signal or Relative to the Input TX Signal The timing reference of TX pulses is known to the TSC 510 since either the TSC 510 sources the TXS signal to the DDI 520 (Mode "TXMode_TSC") or sinks the TXS signal from the DDI 520 (Mode "TXMode_DDI"). The TSC 510 synchronizes its receive window to TX and will need programmability to phase delay its demodulation to account for variations in throughput delay between TXS signal and the corresponding pulses received on the RX sensor lines. Similarly, the phase delay of the demodulator can be delayed relative to the input TX signal.

The embodiments described herein can provide a way to synchronize a set of output (TX) and input (RX) signals, where both sets of signals are generated by different ICs, and where the RX IC needs to have the flexibility to control the pattern sequence played out on the TX lines from the other IC. This may have applications in 2-way communication receivers implemented as a chipset, for example. Proper synchronization of a communications receiver to a transmitted signal may be required for lower bit error rate (BER) in digital communications, e.g. the use of correlation sequences for code division multiple access (CDMA).

Figure 6:
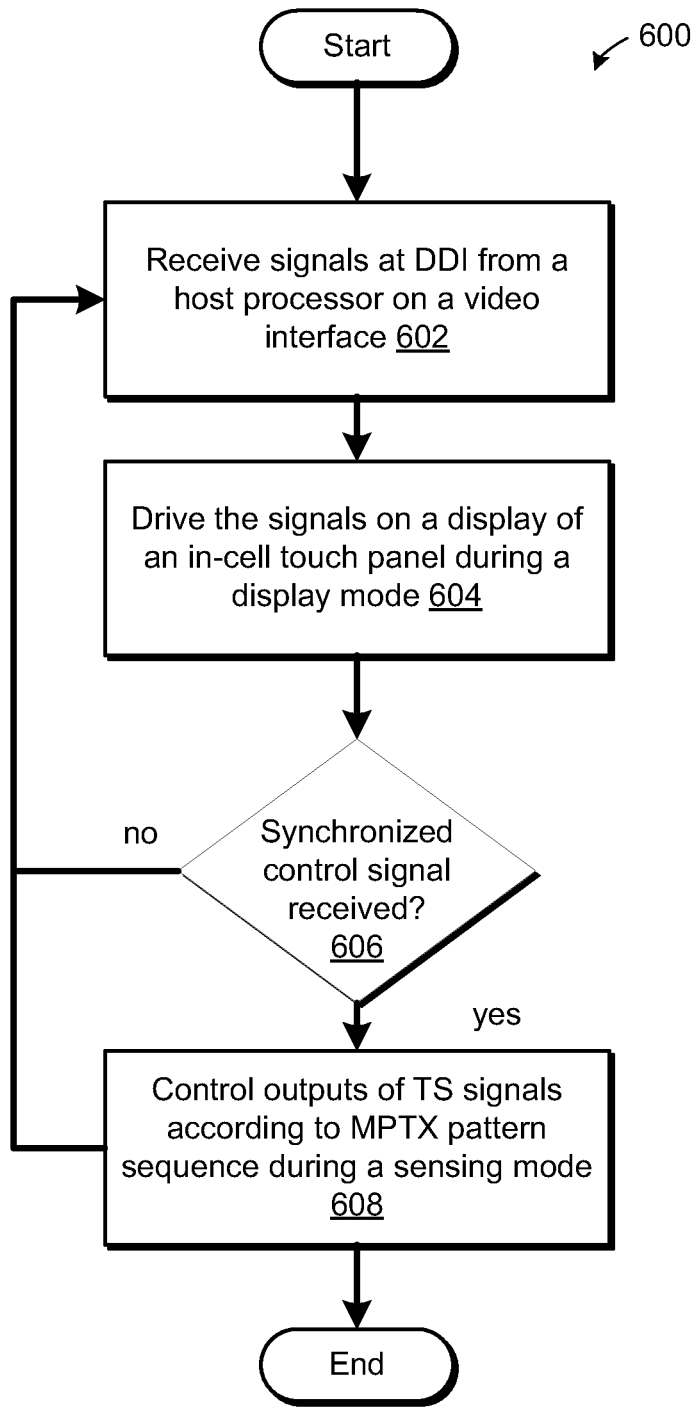
FIG. 6 is a flow diagram of a method of synchronizing a TSC and a DDI for operation with an in-cell touch panel according to an embodiment.

FIG. 6 is a flow diagram of a method 600 of synchronizing a TSC and a DDI for operation with an in-cell touch panel according to an embodiment. The method 600 may be performed by processing logic that may comprise hardware (circuitry, dedicated logic, etc.), software (such as is run on a general purpose computing system or a dedicated machine), firmware (embedded software), or any combination thereof. In one embodiment, the DDI 120 of FIGS. 1 and 2 performs the method 600. In another embodiment, the DDI 520 of FIG. 5 performs the method 600. Alternatively, other components of the electronic system 100, 200, 500 perform some or all of the operations of method 600.

Referring to FIG. 6, the method 600 begins with receiving signals at a display driver integrated circuit (DDI) from a host processor over a video interface (block 602). The processing logic of the DDI drives the signals on a display of an in-cell touch panel during a display mode (block 604). The in-cell touch panel includes a TX layer including multiple common electrodes that are shared with a reference layer of the display. The processing logic receives a synchronized control signal over a control interface from a touch screen controller (TSC) (bock 606). In response to the synchronized control signal, the processing logic controls outputs of a TX signal on the common electrodes according to a multi-phase transmit (MPTX) pattern sequence during a sensing mode (block 608), and the method returns to block 602 and repeats.

In a further embodiment, the processing logic controls the outputs of the TX signal by performing a look-up operation in a TX pattern table stored in memory of the DDI. The TX pattern table stores the MPTX pattern sequence.

In a further embodiment, the processing logic measures RX signals on TX electrodes of the in-cell touch panel, and determines if an object is proximate to the capacitance sense array based on the measured RX signals.

In one embodiment, the synchronized control signal is based on a tearing effect (TE) signal output from the DDI. In another embodiment, the synchronized control signal is based on the Vsync, Hsync, or both.

The flow chart of FIG. 6 shows how the synchronization of the DDI and TSC is performed. In one embodiment, the TSC is a capacitive TSC, such as the TrueTouch® capacitive touchscreen controllers, such as the CY8CTMA3xx family of TrueTouch® Multi-Touch All-Points touchscreen controllers, developed by Cypress Semiconductor Corporation of San Jose, Calif. The TrueTouch® capacitive touchscreen controllers sensing technology can be used to resolve touch locations of multiple fingers and a stylus on the touch-screens, supports leading operating systems, and is optimized for low-power multi-touch gesture and all-point touchscreen functionality. Alternatively, the synchronization features may be implemented in other touchscreen controllers, or other touch controllers of touch-sensing devices.

The embodiments described herein may be used in various designs of mutual capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

Figure 7:
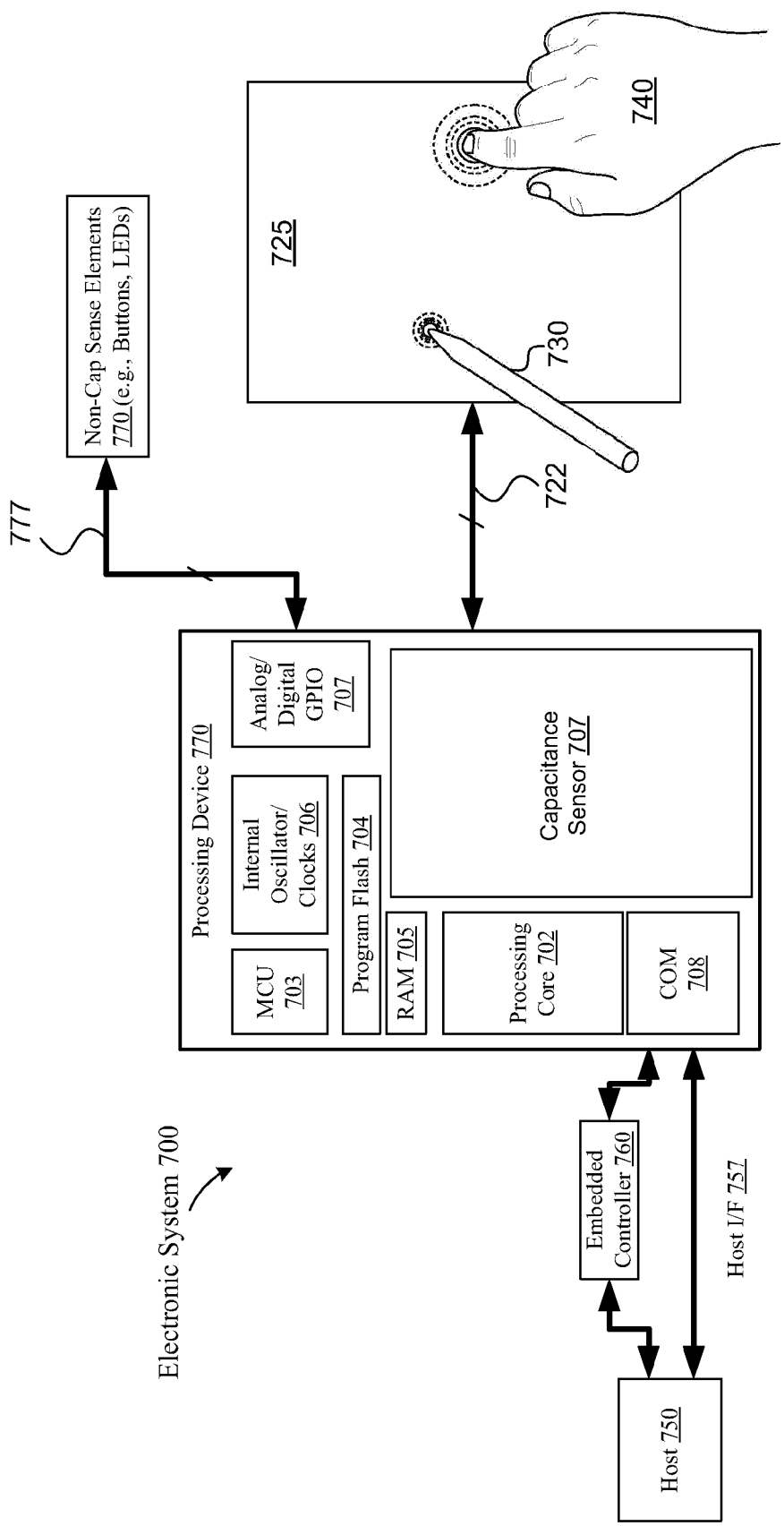
FIG. 7 is a block diagram illustrating one embodiment of an electronic system having a processing device for detecting a presence of a touch object and a stylus.

FIG. 7 is a block diagram illustrating one embodiment of an electronic system 700 having a processing device 710 for detecting a presence of a touch object and a stylus. The processing device 710 may be any of the TSCs described herein. The processing device 710 is configured to detect one or more touches on a touch-sensing device, such as the capacitive sense array 725 that is part of the in-cell touch panels as described herein. The processing device can detect conductive objects, such as touch objects 740 (fingers or passive styluses, an active stylus 730, or any combination thereof.

Electronic system 700 includes processing device 710, capacitive sense array 725, stylus 730, host processor 750, embedded controller 760, and non-capacitive sense elements 770. The capacitive sense elements are electrodes of conductive material, such as copper. The sense elements may also be part of an ITO panel. The capacitive sense elements can be configured to allow the capacitive-sensing circuit 701 to measure self-capacitance, mutual capacitance, or any combination thereof. In the depicted embodiment, the electronic system 700 includes the capacitive sense array 725 coupled to the processing device 710 via bus 722. The capacitive sense array 725 may include a multi-dimension capacitive sense array. The multi-dimension sense array includes multiple sense elements, organized as rows and columns. In another embodiment, the capacitive sense array 725 operates as an all-points-addressable ("APA") mutual capacitive sense array. In another embodiment, the capacitive sense array 725 operates as a coupled-charge receiver. In another embodiment, the capacitive sense array 725 is non-transparent capacitive sense array (e.g., PC touchpad). The capacitive sense array 725 may be disposed to have a flat surface profile. Alternatively, the capacitive sense array 725 may have non-flat surface profiles. Alternatively, other configurations of capacitive sense arrays may be used. For example, instead of vertical columns and horizontal rows, the capacitive sense array 725 may have a hexagon arrangement, or the like, as would be appreciated by one of ordinary skill in the art having the benefit of this disclosure. In one embodiment, the capacitive sense array 725 may be included in an ITO panel or a touch screen panel.

The operations and configurations of the processing device 710 and the capacitive sense array 725 for detecting and tracking the touch object 740 and stylus 730 are described herein. In short, the processing device 710 is configured to detect a presence of the touch object 740, a presence of a stylus 730 on the capacitive sense array 725, or any combination thereof. The processing device 710 may detect and track the stylus 730 and the touch object 740 individually on the capacitive sense array 725. In one embodiment, the processing device 710 can detect and track both the stylus 730 and touch object 740 concurrently on the capacitive sense array 725. If the touching object is an active stylus, in one embodiment, the active stylus 730 is configured to operate as the timing "master," and the processing device 710 adjusts the timing of the capacitive sense array 725 to match that of the active stylus 730 when the active stylus 730 is in use. In one embodiment, the capacitive sense array 725 capacitively couples with the active stylus 730, as opposed to conventional inductive stylus applications. It should also be noted that the same assembly used for the capacitive sense array 725, which is configured to detect touch objects 740, is also used to detect and track a stylus 730 without an additional PCB layer for inductively tracking the active stylus 730.

In the depicted embodiment, the processing device 710 includes analog and/or digital general purpose input/output ("GPIO") ports 707. GPIO ports 707 may be programmable. GPIO ports 707 may be coupled to a Programmable Interconnect and Logic ("PIL"), which acts as an interconnect between GPIO ports 707 and a digital block array of the processing device 710 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 710 may also include memory, such as random access memory ("RAM") 705 and program flash 704. RAM 705 may be static RAM ("SRAM"), and program flash 704 may be a non-volatile storage, which may be used to store firmware (e.g., control algorithms executable by processing core 702 to implement operations described herein). Processing device 710 may also include a memory controller unit ("MCU") 703 coupled to memory and the processing core 702.

The processing device 710 may also include an analog block array (not shown). The analog block array is also coupled to the system bus. Analog block array may also be configured to implement a variety of analog circuits (e.g., ADCs or analog filters) using, in one embodiment, configurable UMs. The analog block array may also be coupled to the GPIO 707.

As illustrated, capacitance-sensing circuit 701 may be integrated into processing device 710. Capacitance-sensing circuit 701 may include analog I/O for coupling to an external component, such as touch-sensor pad (not shown), capacitive sense array 725, touch-sensor slider (not shown), touch-sensor buttons (not shown), and/or other devices. The capacitance-sensing circuit 701 may be configured to measure capacitance using mutual capacitance sensing techniques, self-capacitance sensing technique, charge coupling techniques or the like. In one embodiment, capacitance-sensing circuit 701 operates using a charge accumulation circuit, a capacitance modulation circuit, or other capacitance sensing methods known by those skilled in the art. In an embodiment, the capacitance-sensing circuit 701 is of the Cypress TMA-3xx family of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 701 in any chosen combination. In one embodiment, the TX and RX electrodes of the sense array 200 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance-sensing circuit 701 does not use mutual capacitance or self-capacitance sensing to measure capacitances of the sense elements when performing a stylus sensing. Rather, the capacitance-sensing circuit 701 measures a charge that is capacitively coupled between the sense array 200 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 725, the object causes a decrease in mutual capacitance between some of the TX/RX electrodes. In another embodiment, the presence of a finger increases the coupling capacitance of the electrodes. Thus, the location of the finger on the capacitive sense array 725 can be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In an embodiment, the electronic system 700 may also include non-capacitive sense elements 770 coupled to the processing device 710 via bus 771 and GPIO port 707. The non-capacitive sense elements 770 may include buttons, light emitting diodes ("LEDs"), and other user interface devices, such as a mouse, a keyboard, or other functional keys that do not use capacitance sensing. In one embodiment, buses 721, 722, and 771 are embodied in a single bus. Alternatively, these buses may be configured into any combination of one or more separate buses.

Processing device 710 may include internal oscillator/clocks 706 and communication block ("COM") 708. In another embodiment, the processing device 710 includes a spread spectrum clock (not shown). The oscillator/clocks block 706 provides clock signals to one or more of the components of processing device 710. Communication block 708 may be used to communicate with an external component, such as a host processor 750, via host interface ("I/F") line 751. Alternatively, processing device 710 may also be coupled to embedded controller 760 to communicate with the external components, such as host processor 750. In one embodiment, the processing device 710 is configured to communicate with the embedded controller 760 or the host processor 750 to send and/or receive data.

Processing device 710 may reside on a common carrier substrate such as, for example, an integrated circuit ("IC") die substrate, a multi-chip module substrate, or the like. Alternatively, the components of processing device 710 may be one or more separate integrated circuits and/or discrete components. In one exemplary embodiment, processing device 710 is the Programmable System on a Chip (PSoC®) processing device, developed by Cypress Semiconductor Corporation, San Jose, Calif. Alternatively, processing device 710 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 710 may also be done in the host.

Capacitance-sensing circuit 701 may be integrated into the IC of the processing device 710, or alternatively, in a separate IC. Alternatively, descriptions of capacitance-sensing circuit 701 may be generated and compiled for incorporation into other integrated circuits. For example, behavioral level code describing the capacitance-sensing circuit 701, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 701.

It should be noted that the components of electronic system 700 may include all the components described above. Alternatively, electronic system 700 may include some of the components described above.

In one embodiment, the electronic system 700 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

The embodiments described herein can be used with existing TSCs, which are not developed specifically for in-cell touch panels if the DDI 120 (or 520) provides for the I/O and registers that are part of the display interface definition described herein. Also, as described above, the assignee of the present application has developed various multi-TX phase scanning sensing modes that can be used with the proposed interface. The embodiments may also provide improvement touch systems resulting from the ability to use MPTX, high voltage drive, TSC scanning synchronized to the LCD blanking time, and use of special sensing modes, such as water rejection sensing modes. These improvements may also result in high SNR, better LCD noise immunity and improved performance for stylus, hover and glove touch by use of special sensing modes. Synchronization can be performed between DDI and TSC insofar that TSC has knowledge of the display blank timings. This may be accomplished by routing HSync/VSync signals, or alternative TE signal, to the TSC and programming the TSC to offset the scan timing windows correctly with respect to these display timing reference signals. The knowledge of TX pattern sequence definition in DDI memory allows the system to go beyond the activation of 1 TX per timeslot. Also, the embodiments allow control of TX output signals (ability to provide Hi-Z output on TX lines from DDI 120) by the TSC so that TSC can drive the TX lines. Also, the embodiments described herein may have the ability for TSC to control the TX pattern sequence played out by the DDI. The TSC may include hardware or software for processing of TE signal from DDI, which can carry either V display reference, or a composite H and V display reference. In case of a composite reference, the TSC needs the processing to only extract a V reference if it is to perform TSC scanning only during the vertical blanking. In an alternative embodiment, synchronization between DDI and TSC can be done without use of discrete interface signals or register control from a single host to multiple ICs by using single-chip integration as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An electronic system comprising:
 a display driver integrated circuit (DDI), wherein the DDI comprises:
  a video interface to receive display signals from a host processor;
  a control interface to receive control signals from a touch screen controller (TSC);
  a display interface, wherein the DDI is configured to drive electrodes of a touch panel with the display signals in a display mode and to drive the electrodes of the touch panel with transmit (TX) signals for mutual capacitance sensing in a touch sensing mode according to the control signals received on the control interface from the TSC, wherein the DDI is configured to drive different TX signal sequences of a TX signal in different sensing intervals on the electrodes of the touch panel for multi-phase scanning; and
  memory to store a TX pattern matrix of the different TX signal sequences of the TX signal, wherein the control signals are configured to control output of the TX pattern matrix on the electrodes of the touch panel, wherein the TX pattern matrix comprises a plurality of rows corresponding to the electrodes and a plurality of columns corresponding to the different sensing intervals, wherein a plurality of matrix elements of the TX pattern matrix store different values for the different TX signal sequences during the different sensing intervals, wherein a first value indicates an in-phase TX signal is to be applied to the corresponding electrode, a second value indicates an out-of-phase TX signal is to be applied to the corresponding electrode and a third value indicates a high-impedance (Hi-Z) output is to be applied to the corresponding electrode, and wherein the touch panel is an in-cell touch panel in which common electrodes are configured as a TX layer during the touch sensing mode of the in-cell touch panel and as a common voltage reference layer during the display mode of the in-cell touch panel.

2. The electronic system of claim 1, further comprising the TSC coupled to the DDI, the TSC is configured to send the control signals to the DDI over the control interface.

3. The electronic system of claim 2, wherein the TSC comprises a sequencer to control the control signals sent to the DDI.

4. The electronic system of claim 2, wherein the TSC comprises a plurality of multiplexers to configure one or more of the electrodes of the touch panel as TX electrodes or RX electrodes based on a mode of operation of the TSC.

5. The electronic system of claim 2, further comprising the in-cell touch panel coupled to the display interface of the DDI and coupled to the control interface of TSC.

6. The electronic system of claim 2, wherein the TSC comprises:
 a sequencer to generate the control signals on the control interface;
 a plurality of multiplexers to configure one or more of the electrodes of the touch panel as TX electrodes or RX electrodes based on a mode of operation of the TSC;
 a plurality of receive channels to measure receive (RX) signals on a plurality of RX electrodes of the in-cell touch panel; and
 a multiplexer coupled to the plurality of multiplexers and the plurality of receive channels.

7. The electronic system of claim 5, further comprising the host processor coupled to the video interface of the DDI.

8. The electronic system of claim 1, wherein the signals on the video interface comprises digital red, green, blue (RGB) signals, a horizontal synchronization signal (HSync), and a vertical synchronization signal (VSync).

9. The electronic system of claim 1, wherein the video interface comprises a high-speed packetized video link.

10. The electronic system of claim 9, wherein the high-speed packetized video link is defined according to the Mobile Industry Processor Interface (MIPI) specification, and wherein the DDI is configured to output a tearing effect (TE) signal to the host processor and the TSC.

11. The electronic system of claim 10, wherein the TSC is configured to separate the TE signal into virtual synchronization and horizontal synchronization signals.

12. The electronic system of claim 1, wherein a fourth value indicates a ground potential is to be applied to the corresponding electrode.

13. The electronic system of claim 1, further comprising the in-cell touch panel coupled to the display interface of the DDI.

14. The electronic system of claim 1, further comprising the host processor coupled to the video interface of the DDI.

15. The electronic system of claim 1, wherein the TX pattern table stores at least eight different TX signal sequences.

16. A method comprising:
 receiving signals at a display driver integrated circuit (DDI) from a host processor over a video interface;
 driving, by the DDI, the signals on a display of an in-cell touch panel during a display mode, wherein the in-cell touch panel comprises a transmit (TX) layer comprising a plurality of common electrodes that are shared with a common voltage reference layer of the display, wherein the plurality of common electrodes are configured as the TX layer during a touch sensing mode and as the common voltage reference layer during the display mode;
 receiving a synchronized control signal at the DDI over a control interface from a touch screen controller (TSC); and
 in response to the synchronized control signal, controlling outputs of transmit (TX) signals on the plurality of the common electrodes according to different transmit (TX) signal sequences for mutual capacitance sensing during the touch sensing mode, wherein the controlling outputs of the TX signals comprises controlling outputs of the TX signals according to a multi-phase transmit (MPTX)

pattern sequence stored in a TX pattern table stored in memory of the DDI, wherein the TX pattern table stores different TX signal sequences, wherein the TX pattern table comprises a plurality of rows corresponding to the plurality of common electrodes and a plurality of columns corresponding to different sensing intervals, wherein a plurality of matrix elements of the TX pattern matrix store different values for the different TX signal sequences during the different sensing intervals, wherein a first value indicates an in-phase TX signal is to be applied to the corresponding one of the plurality of common electrodes, and a second value indicates an out-of-phase TX signal is to be applied to the corresponding one of the plurality of common electrodes and a third value indicates a high-impedance (Hi-Z) output is to be applied to the corresponding one of the plurality of common electrodes.

17. The method of claim 16, further comprising:
measuring receive (RX) signals on a plurality of RX electrodes of the in-cell touch panel; and
determining if an object is proximate to the in-cell touch panel based on the measured RX signals.

18. The method of claim 16, wherein a fourth value indicates a ground potential is to be applied to the corresponding one of the plurality of common electrodes.

19. The method of claim 16, wherein the MPTX pattern sequence comprises eight different TX signal sequences.

20. The method of claim 16, wherein the MPTX pattern sequence comprises twelve different TX signal sequences.

* * * * *